United States Patent
Gross et al.

(10) Patent No.: US 9,229,098 B2
(45) Date of Patent: Jan. 5, 2016

(54) DETECTION OF RADAR OBJECTS WITH THE AID OF A RADAR SENSOR OF A MOTOR VEHICLE

(71) Applicants: Volker Gross, Ditzingen (DE); Michael Schoor, Stuttgart (DE)

(72) Inventors: Volker Gross, Ditzingen (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 275 days.

(21) Appl. No.: 13/898,168

(22) Filed: May 20, 2013

(65) Prior Publication Data
US 2013/0314272 A1 Nov. 28, 2013

(30) Foreign Application Priority Data
May 25, 2012 (DE) .......................... 10 2012 208 852

(51) Int. Cl.
*G01S 13/06* (2006.01)
*G01S 13/93* (2006.01)

(52) U.S. Cl.
CPC ............... *G01S 13/06* (2013.01); *G01S 13/931* (2013.01); *G01S 2013/9375* (2013.01)

(58) Field of Classification Search
CPC G01S 13/06; G01S 13/931; G01S 2013/9375
USPC ............................................................. 342/70
See application file for complete search history.

(56) References Cited

U.S. PATENT DOCUMENTS

| 2009/0009383 | A1* | 1/2009 | Nakanishi ................. G01S 3/20 342/118 |
|---|---|---|---|
| 2012/0119937 | A1 | 5/2012 | Yamada et al. |
| 2013/0246020 | A1* | 9/2013 | Zeng ................................. 703/2 |

FOREIGN PATENT DOCUMENTS

| DE | 10 2004 036 580 | 3/2006 |
|---|---|---|
| JP | 2009-79917 | 4/2009 |
| WO | WO 2006/010662 | 2/2006 |

* cited by examiner

*Primary Examiner* — Timothy A Brainard
(74) *Attorney, Agent, or Firm* — Kenyon & Kenyon LLP (57) ABSTRACT

A method and a system for detecting radar objects with the aid of an angle-resolving radar sensor of a motor vehicle in the presence of an object which extends in the driving direction laterally next to the motor vehicle's own lane and reflects radar waves, a measured position distribution which corresponds to a distribution of azimuth angles of received radar signals of the radar sensor reflected off a radar object being compared to a model of a position distribution which is expected taking into account the presence of the object extending in the driving direction next to the vehicle's own lane, and is a function of a distance from the radar object and a position of a radar object being determined based on the result of the comparison.

20 Claims, 5 Drawing Sheets

DETECTION OF RADAR OBJECTS WITH THE AID OF A RADAR SENSOR OF A MOTOR VEHICLE

FIELD OF THE INVENTION

The present invention relates to a system and a method for detecting radar objects with the aid of an angle-resolving radar sensor of a motor vehicle in the presence of an object, e.g., a guardrail, which extends in the driving direction laterally next to the motor vehicle's own lane and reflects radar waves.

BACKGROUND INFORMATION

Radar sensors are, for example, employed in ACC (adaptive cruise control) systems for motor vehicles and are used to determine the positions and relative speeds of radar objects, so that, as part of an adaptive cruise control, the speed of one's own vehicle may be subsequently adjusted to the speed of a preceding vehicle and the distance to the preceding vehicle may be controlled to an appropriate value.

Such a radar sensor has, for example, multiple channels which are each assigned at least one antenna element having a particular directional characteristic and an evaluation device. The high-frequency signal received in the different channels are converted by being mixed with a reference frequency, by maintaining the phase and amplitude relations, into low-frequency signals, which are evaluated in an electronic evaluation unit. For example, the low-frequency signals may be digitized using analog/digital converters and then further processed digitally. By evaluating the phase relations and/or by evaluating the amplitude relations between the different channels, it is possible to determine the azimuth angle of a located radar object.

Each radar object is plotted in the frequency spectrum of a channel in the form of a peak whose position is a function of the Doppler shift and thus of the relative speed of the radar object. If the transmission frequency of the radar system is modulated, as it is the case in an FMCW (Frequency Modulated Continuous Wave) radar, for example, then the position of the peaks is also a function of the propagation time of the radar signals. If the transmitted signal has different, appropriately selected frequency ramps within one measuring cycle, it is possible to compute the relative speed of the object and the distance of the object from the frequencies of the obtained peaks.

German Published Patent Application No. 10 2004 036 580 describes a method and a device for detecting an object in a vehicle which is equipped with an object sensor system which emits electromagnetic waves and receives the waves reflected off the objects within the detection range. A moving object in the form of a preceding vehicle is measured with the aid of a direct object reflection in which the microwave radiation emitted by the object sensor system is reflected off the object and is immediately received again by the object sensor system. In a situation in which an object, e.g., a guardrail, extending along the roadway is present on which another reflection of the measuring radiation takes place, the measuring radiation emitted by the object sensor system may be reflected off the preceding vehicle and then again off the guardrail, and received by the object sensor system as an indirect object reflection. This indirect object reflection is recognized by the object sensor system as a phantom target, since the roadway edge is estimated or measured and it is recognized that the phantom target is beyond the roadway edge. A seemingly real object location which is computable with the aid of the location of the phantom target and with the aid of a computed reflection point on the guardrail is used to check the directly measured object reflections for plausibility.

SUMMARY

In a situation involving a multipath propagation of the radar signals in which in addition to direct object reflections, indirect object reflections are also received in which radar signals reflected off a radar object to be located are, for example, additionally reflected off a guardrail laterally next to the roadway, the recognition of preceding vehicles as radar objects or as phantom targets may be made more difficult or is prevented by estimated object angles or phantom target object angles being disrupted and containing noise. The accuracy and reliability of the angle determination may, in particular, be impaired in the case of great distances. It may, for example, happen that an azimuth angle of a really existing, moving radar object is determined which does not correspond to the actual position of the radar object, but to a position which is laterally offset in the direction of the guardrail, e.g., to a position between the actual object position and a phantom target position of a mirrored object. This may prove to be disadvantageous for a distance control function of an adaptive cruise control system which is based on object recognition.

The object of the present invention is to improve the detection of moving radar objects in the presence of a guardrail or another radar-waves reflecting object which extends in the driving direction laterally next to the vehicle's own lane.

One contribution to achieving this object is provided according to the present invention by a method of the type mentioned at the outset, including the steps:

comparing a measured position distribution which corresponds to a distribution of azimuth angles of received radar signals of the radar sensor reflected off a radar object to a model of a position distribution which is expected taking into account the presence of the object extending in the driving direction next to the vehicle's own lane, and which is a function of a distance from the radar object; and determining a position of a radar object based on the result of the comparison.

Here, the object extending in the driving direction may, for example, be an object extending laterally along a roadway, such as a guardrail. The measured position distribution may, for example, be a distribution of an angle position, in particular an azimuth angle, or a distribution of a lateral position, e.g., a lateral position (transverse offset) in relation to one's own vehicle. By comparing the measured position distribution to a model of a position distribution, it is possible during the evaluation of the received radar signals to explicitly take into account the properties of the multipath propagation of the radar signals and their effects on the received signals. The quality of an object tracking may be improved in this way. In this way, it may be made possible to detect the real object even in the case of a great object distance at which based on the received radar signals it is not possible to separate a real object from a mirror object mirrored on a guardrail.

In the case of a given distance from the object, the model used for comparison with the measured position distribution may, for example, describe a distribution of an angle position, in particular of an azimuth angle, or a distribution of a lateral position, e.g., a lateral position (transverse offset) in relation to one's own vehicle. The model of an expected position distribution may, for example, include one or multiple characteristic properties of the expected position distribution or it may include a modeled position distribution. A modeled position distribution may, for example, be directly compared to a measured position distribution, or at least one of the two position distributions may be used for comparison in a converted form.

Prior to the step of comparing, the method preferably includes the step of determining the measured position distribution based on continuously updated records of positions which correspond to the azimuth angles of received radar signals of the radar sensor reflected off the radar object. For example, at least one azimuth angle may be determined in every measuring cycle of the radar sensor in the case of an object reflection, and the measured position distribution may include positions corresponding to the azimuth angles measured in the multiple measuring cycles. For example, the measured position distribution may be determined based on the received radar signals from the n last measuring cycles in each case, n being a number which determines a width of a sliding time window of the position records.

The method preferably also includes the step of determining a model phase of the model based on the result of the comparison, the model phase being determined from several model phases of the model. The above-mentioned several model phases may, for example, include model phases which correspond to expected position distributions which differ in relation to a reduction of the distribution being present and/or pronounced in a transition range between positions which correspond to a position of the radar object and a position of a mirror object. The model phases may thus differ in relation to a separability of peaks of the expected position distribution which correspond to a position of the radar object and a position of a mirror object. For example, a position distribution which at least scatters uniformly between a position of the radar object and a position of a mirror object may be expected in at least one model phase, and a position distribution having two separate peaks, each of which corresponds to a position of the radar object and a position of a mirror object, may be expected in at least one model phase, the latter position distribution being expected at a smaller distance from the radar object than the previously mentioned position distribution.

The above-mentioned several model phases may, for example, include model phases which correspond to expected position distributions, each of which has a scatter of values of the distribution around one position corresponding to a radar object and around one position corresponding to a mirror object and which differ with regard to a scattering width which is a function of the distance from the radar object.

Furthermore, one contribution for achieving the above-mentioned object is provided according to the present invention by a system for detecting radar objects using an angle-resolving radar sensor of a motor vehicle in the presence of an object which extends in the driving direction laterally next to the vehicle's own lane and which reflects radar waves, the system including:
 a unit which is configured to determine a measured position distribution which corresponds to a distribution of azimuth angles of received radar signals of the radar sensor reflected off the radar object,
 a unit which is configured to compare the measured position distribution to a model of a position distribution which is expected taking into account the presence of the object extending in the driving direction next to the vehicle's own lane, and which is a function of a distance from the radar object; and
 a unit which is configured to determine a position of a radar object based on the result of the comparison.

DETAILED DESCRIPTION

Figure 1:
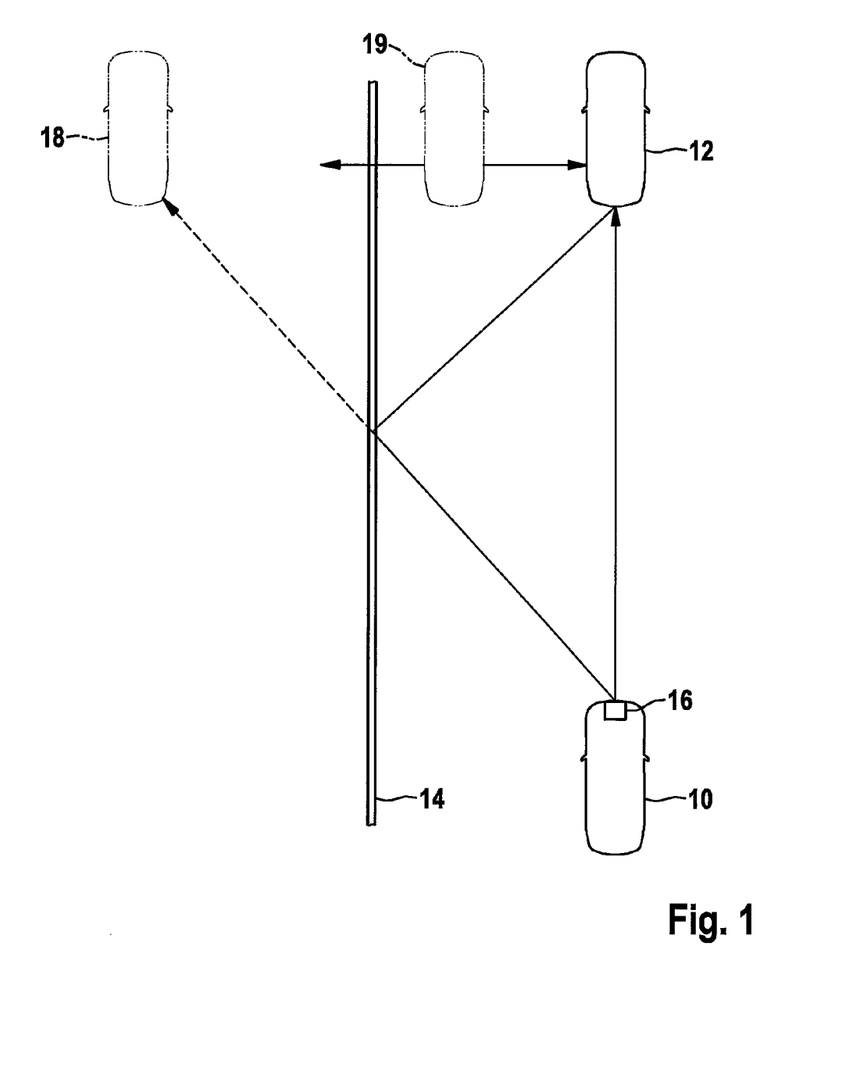
FIG. 1 shows a schematic representation of a traffic situation involving a multipath reflection of radar signals off a radar object.

FIG. 1 shows a traffic situation involving one's own vehicle 10 and a radar object 12 to be located in the form of a directly preceding vehicle. The two vehicles are in the same roadway. Laterally along the roadway, there is an object 14 in the form of a guardrail which reflects radar waves.

Vehicle 10 is equipped with an angle-resolving radar sensor 16 which is situated in the front area of vehicle 10 and which is configured to detect radar objects in a sensor detection range in front of one's own vehicle 10. For example, an FMCW radar sensor may be involved in which the frequency of a transmitted radar signal is modulated periodically, e.g., four ramps per measuring cycle, in particular in the form of at least one frequency ramp. Radar sensor 16 has multiple antenna elements having different directional characteristics which allow a determination of an azimuth angle of a received radar signal.

FIG. 1 schematically shows, with the aid of an arrow connecting one's own vehicle 10 and radar object 12 in a straight line, a first propagation path via which a direct radar reflection off radar object 12 is received. Furthermore, a second propagation path via a reflection off object 14 is illustrated schematically via which an indirect object reflection off radar object 12 is received. The azimuth angle, at which the indirect object reflection is received, corresponds to a mirror object 18 in a position behind the guardrail. The reflection thus takes place transversely in relation to the driving direction, in particular on a side of object 14 extended in the driving direction.

Radar sensor 16 is, for example, configured to assign at least one azimuth angle, from which the radar signal is received, to each of the radar signals received during a measuring cycle of radar sensor 16 based on the received radar signals of radar sensor 16 reflected off a radar object 12. If in the case of greater distances between one's own vehicle 10 and radar object 12 to be located the separability of radar sensor 16 with regard to the azimuth angle of the received radar signals is reduced, it may happen that azimuth angles are assigned to the received object reflections which deviate from the actual azimuth angles of radar object 12 and mirror object 18 and may, in particular, correspond to a position of a so-called phantom object 19 in an angle range between radar object 12 and mirror object 18.

Figure 2:
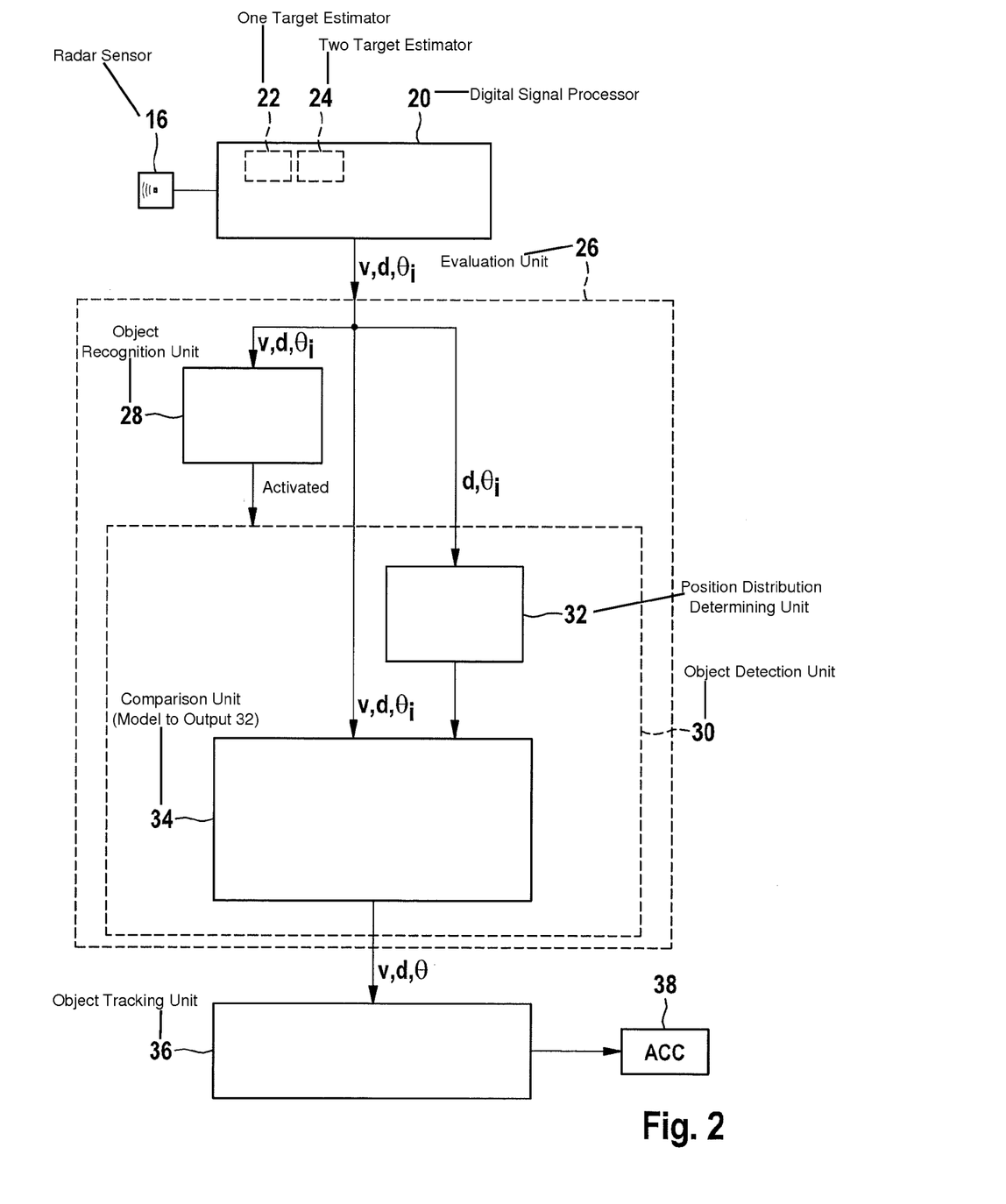
FIG. 2 shows a schematic block diagram of a motor vehicle sensor system.

FIG. 2 shows a system for detecting radar objects in the form of a motor vehicle sensor system. The system includes a sensor system which includes radar sensor 16 and a digital signal processing unit 20. Signal processing unit 20 is designed in a manner known per se to evaluate output signals of the channels of radar sensor 16 and to determine for a radar object detected by radar sensor 16 a relative speed v, an object distance d, and at least one azimuth angle from the low-frequency signals obtained by the different receiving antenna elements of radar sensor 16. The measured values for distance d and relative speed v scatter, for example, around the values of the path lengths or the relative speeds of radar object 12 and mirror object 18.

Signal processing unit 20 includes a one-target estimator 22 which is configured to determine an azimuth angle of a radar echo for each frequency ramp of a measuring cycle. For example, normalized amplitudes and phases of peaks of the intermediate frequency signals are aligned with the appropriate antenna diagrams for the antenna elements of radar sensor 16, so that the azimuth angles of the located objects may be determined with the aid of a known angle dependency of the amplitudes and phases. For this purpose, a search space of amplitude and phase differences, which is one-dimensional, i.e., computed as a function of the angle, is searched to find a correlation between the measured signal and a signal expected for an angle. A peak of the correlation then identifies the most probable value of the azimuth angle.

Furthermore, signal processing unit 20 optionally includes a two-target estimator 24 which is configured to determine two azimuth angles of a radar echo for at least one frequency ramp during one measuring cycle, when it is possible that the object reflection is assigned to two radar objects in different angular positions. For this purpose, a search space which is two-dimensional, i.e., computed as a function of a first angle and of a second angle, is searched to find a correlation between the measured signal and a signal expected for a combination of angles.

One-target estimator 22 and two-target estimator 24 may, for example, be implemented as an algorithm in signal processing unit 20.

For every measuring cycle, the values, ascertained in the case of object reflections, of relative speed v, of object distance d, and of estimated azimuth angle $\theta_i$, i being 1, ..., N+2, are output to an evaluation unit 26. The number of azimuth angles is N one-target estimations plus two azimuth angles for one two-target estimation.

Evaluation unit 26 optionally includes a device 28 for recognizing a presence of an object 14, such as a guardrail, which extends in the driving direction laterally next to the vehicle's own lane and which additionally reflects the radar signals of the radar sensor reflected off radar objects. Device 28, for example, recognizes the presence of a guardrail from the occurrence of radar echoes of a series of posts of the guardrail. Posts of a guardrail represent well detectable radar objects. Moreover, information may be obtained regarding the lateral distance to the guardrail. In the case of the recognized presence of a guardrail or a similar object 14, which reflects radar waves, along the roadway or laterally next to the vehicle's own lane, an object detection unit 30 is activated which is configured to determine positions of radar objects taking into account the situation of a multiple reflection caused by object 14.

Object detection unit 30 includes a unit 32 which is configured to determine, based on azimuth angles $\theta_i$ and object distance d, a position distribution of lateral positions dy which corresponds to a distribution of azimuth angles $\theta_i$. For this purpose, azimuth angles $\theta_i$ are converted into lateral positions dy with regard to the longitudinal axis of one's own vehicle via object distance d. The distribution is determined, for example, in each case from records of ascertained lateral positions dy obtained during the n last measuring cycles, n=5 or n=10 being selected, for example. In general, number n of the considered measuring cycles is selected in such a way that the relative positions of detected vehicles essentially remain unchanged during normal driving situations. Here, it is assumed that the lateral distance of radar object 12 to the guardrail changes only slowly and thus remains essentially unchanged in the observed sliding window of the last measuring cycles.

Figure 3:
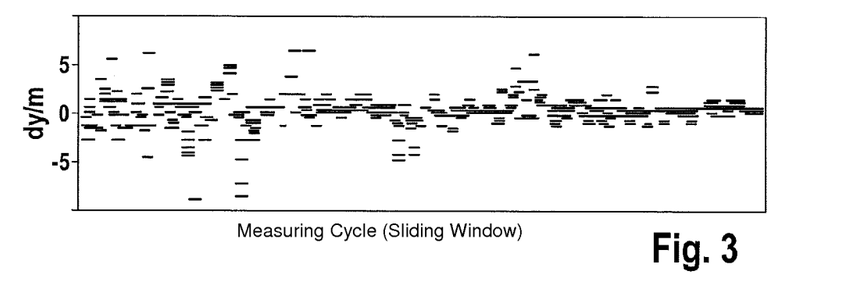
FIG. 3 shows a first schematic representation of a measured position distribution which corresponds to azimuth angles of received radar signals.

FIG. 3 shows, as an example, a chronological characteristic of the distribution of the values of lateral position dy according to the azimuth angles estimated by one-target estimator 22 in an exemplary situation involving a preceding vehicle in which the distance of the vehicle (radar object 12) is gradually reducing, e.g., from 120 m to 40 m, while one's own vehicle 10 and the preceding vehicle are driving in the same lane directly next to a guardrail. The particular, instantaneously determined distribution of lateral positions dy is illustrated against the consecutive measuring cycles in the chronological characteristic. The distribution is determined for one sliding window of the measuring cycles in each case.

Figure 4:
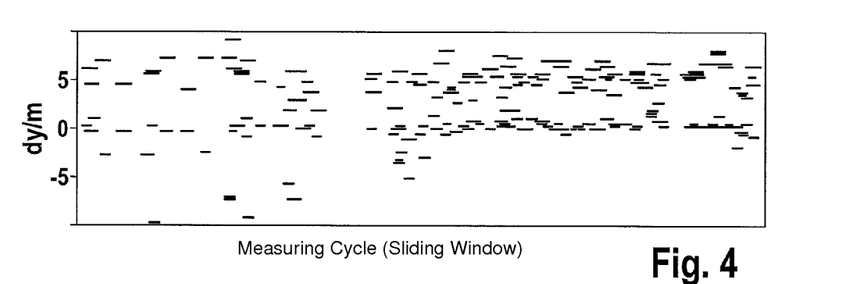
FIG. 4 shows a second schematic representation of a measured position distribution which corresponds to azimuth angles of received radar signals.

FIG. 4 shows in a corresponding representation a distribution of lateral positions dy determined based on the azimuth angles ascertained by two-target estimator 24.

Figure 5:
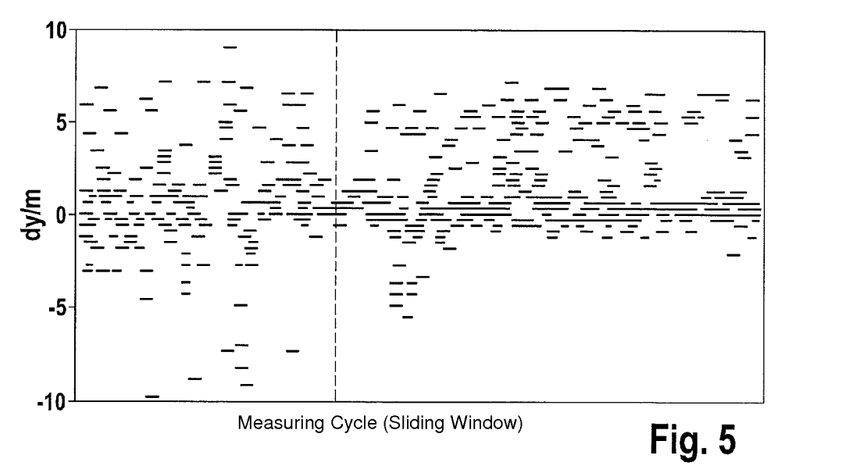
FIG. 5 shows a third schematic representation of a measured position distribution which corresponds to azimuth angles of received radar signals.

FIG. 5 shows in a corresponding representation the chronological characteristic of a distribution of lateral positions dy according to the combined distributions of FIGS. 3 and 4, a compensating weighting of the values resulting from one-target estimator 22 and two-target estimator 24 being carried out. For example, a maximum of four azimuth angles of one-target estimator 22 are present in the case of a measuring cycle having four frequency ramps per measuring cycle. Only one two-target estimation is carried out per measuring cycle, so that no more than two azimuth angles of two-target estimator 24 are present. The values of one-target estimator 22 are therefore weighted once and the values of two-target estimator 24 are weighted twice when they are incorporated into the distribution determined by unit 32.

Object detection unit 30 furthermore includes a unit 34 which is configured to compare the distribution of lateral position dy determined by unit 32 to a model of a position distribution which is expected taking into account the presence of the object extending along the roadway, and is a function of distance d, i.e., to a model of a lateral position distribution as it is to be expected in the case of the recognized presence of a guardrail.

Figure 6:
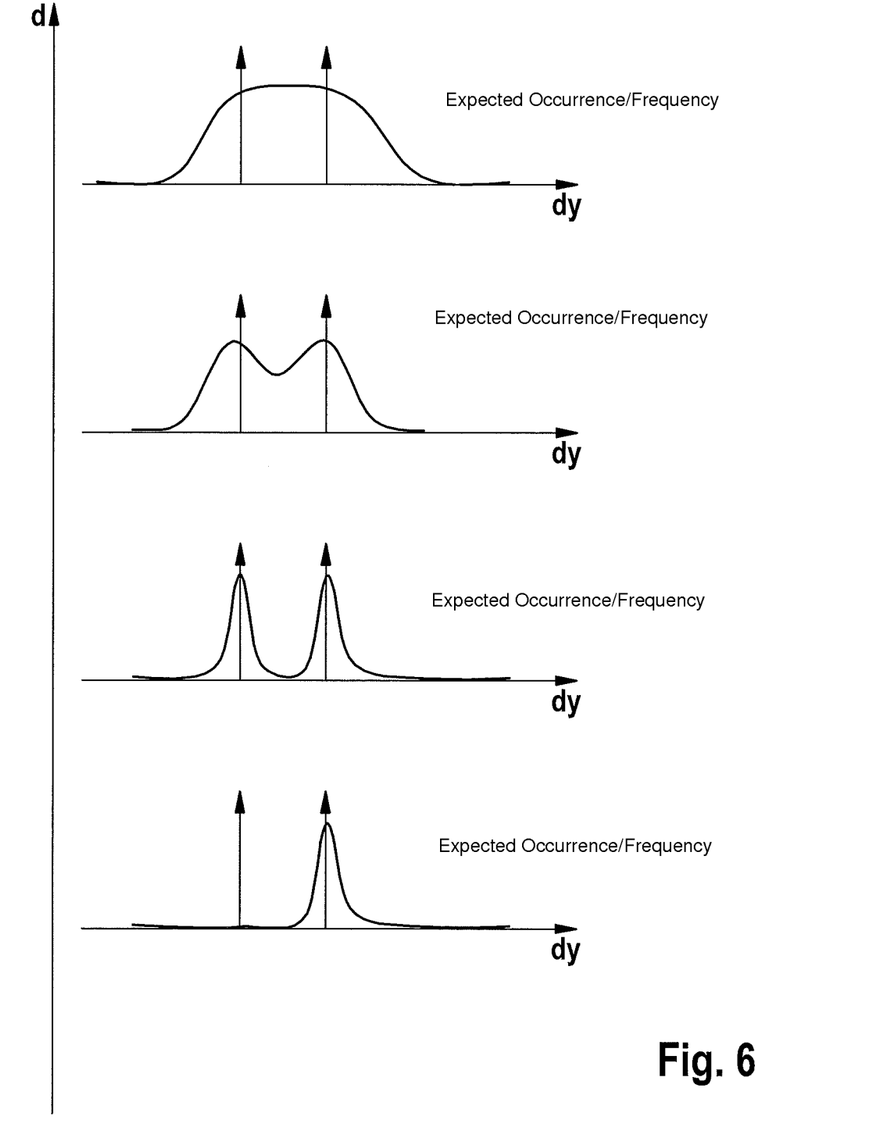
FIG. 6 shows a schematic representation of model phases of a model for a position distribution.

FIG. 6 shows, as an example, four different model phases for the distribution of the lateral positions, which correspond to the expected azimuth angles in the presence of a guardrail, for different distances d from a preceding vehicle. The expected occurrence frequency of an estimated lateral position dy is illustrated. Here, a lateral position of radar object 12 and a lateral position corresponding to a reflection of radar object 12 off guardrail 14 are marked by arrows in each of the illustrated distributions. The model phases, which are a function of object distance d, of the expected distribution of the azimuth angles may, for example, be measured for the particular radar sensor and stored in unit 34 in the form of characteristic parameters, for example.

In a first model phase, the azimuth angles of radar object 12 and mirror object 18 are not separable due to a great object distance d. A wide distribution without pronounced inner maxima is expected which is uniform between the angular positions of radar object 12 and mirror object 18.

In a second model phase, which corresponds to a medium object distance d, relative maxima corresponding to the angular positions of radar object 12 and mirror object 18 may be recognized. However, the distribution scatters widely and also includes intermediate values corresponding to phantom objects 19.

In a third model phase, which corresponds to a small object distance d, the peaks assigned to radar object 12 and mirror object 18 during the distribution are clearly delimited, i.e., separate, from one another. Accordingly, the azimuth angles of radar object 12 and mirror object 18 may be separated from one another.

The transition between the particular model phases essentially depends on object distance d and on the azimuth angle separability of radar sensor 16; moreover, it also depends on lateral distance dy of radar object 12 from the guardrail, since the angular difference between radar object 12 and phantom object 18 is greater in the case of greater lateral distance dy.

In a fourth model, which corresponds to a close range having an even smaller object distance d, indirect object reflections off the guardrail are not received. During the distribution of lateral positions dy, only one peak results corresponding to the azimuth angle of radar object 12.

In FIG. 5, a wide distribution of lateral positions dy is recognizable, for example, during the measuring cycles on the left of a point in time illustrated by a dashed line, this distribution showing weakly pronounced maxima for two values, e.g., for dy=0 m and dy=5 m, in particular when observing the values of two-target estimator 24 illustrated in FIG. 4.

Unit 34 recognizes here the second model phase as applicable based on a comparison to the model phases. Unit 34 thus determines the lateral position which lies on the roadway side of the guardrail and corresponds to the right-hand arrow in FIG. 6 as lateral object position dy. Lateral object position dy determined by unit 34, or a corresponding azimuth angle $\theta$, is detected by object detection unit 30 as an object position and output together with relative speed v and an object distance d to an object tracking unit 36, for example. Object tracking unit 36 is configured in a manner known per se to track and manage radar objects detected by radar sensor 16. It is, for example, connected to an adaptive cruise control system 38 which makes an adaptive cruise control possible.

In the distributions of lateral positions dy illustrated in FIG. 5 to the right of the dashed line, unit 34 recognizes the presence of a situation corresponding to the third model phase. The occurring values in the lateral position of approximately d=5 are clearly separable from those in lateral position y=0. Unit 34 therefore determines as lateral object position dy the value of the maximum on the roadway side of the guardrail and outputs in turn this lateral position dy or a corresponding azimuth angle $\theta$ to object tracking unit 36.

With the aid of object detection unit 30, it is thus possible to improve the object detection in the case of a recognized presence of a guardrail by assigning multiple initially detected azimuth angles $\theta_i$ to only one radar object 12. The object detection may thus be improved in particular in situations corresponding to the first or the second model phase, since mirror objects 18 and phantom objects 19 are not included in the object tracking. Moreover, this may enable an improved recognition of complex traffic situations, e.g., a drive in a narrow alley between stationary radar objects or a traffic situation involving two preceding vehicles driving at approximately the same speed, since such a situation may be differentiated better from the situation illustrated in FIG. 1.

In situations without multiple reflection or if, in one variant without unit 28, object detection unit 30 has not recognized any of the described models as applicable, evaluation unit 26, for example, forwards the ascertained values of relative speed v, object distance d, and azimuth angle $\theta_i$ directly to object tracking unit 36.

Evaluation unit 26 and/or units 30, 32, 34, 36 may, for example, be implemented in the form of algorithms of a digital data processing device.

Figure 7:
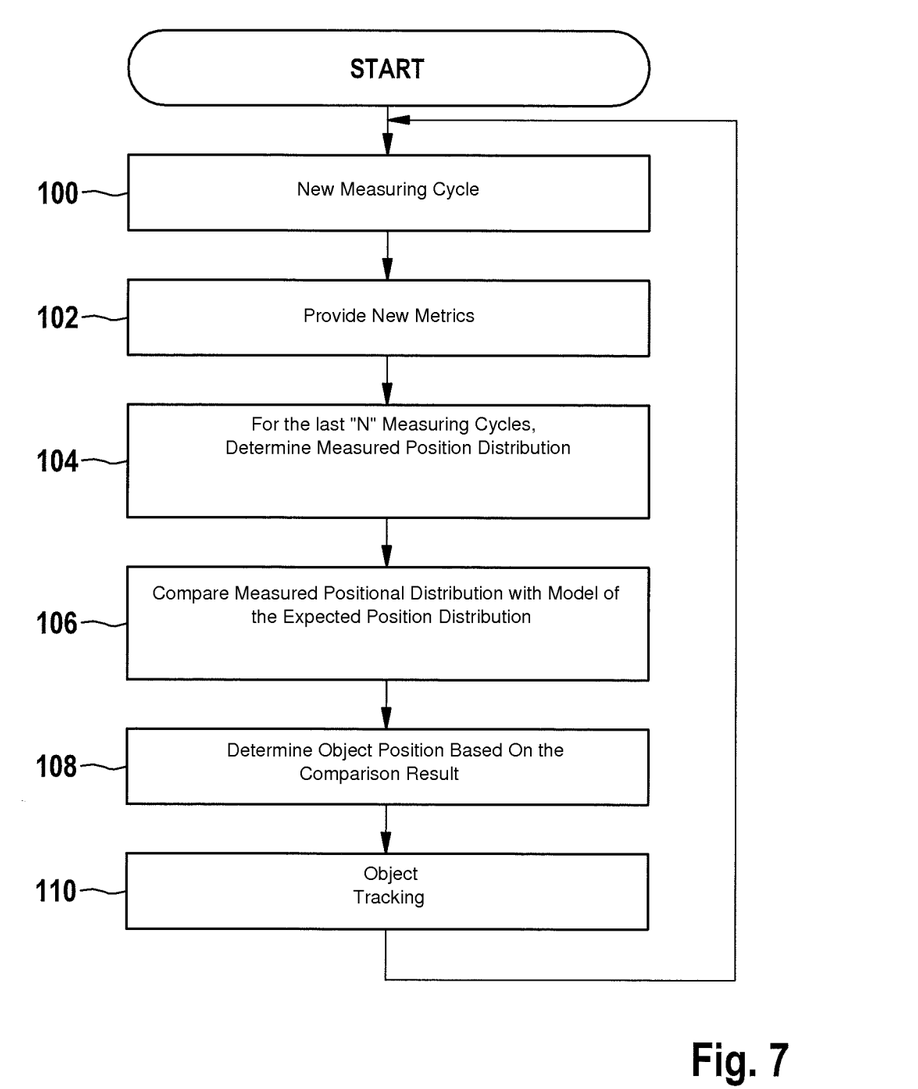
FIG. 7 shows a flow chart of one specific embodiment of a method for object detection.

FIG. 7 shows a flow chart of a method for detecting radar objects 12 with the aid of an angle-resolving radar sensor 16 of a motor vehicle 10 in the presence of an object 14 which extends in the driving direction laterally next to the motor vehicle's own lane and reflects radar waves. The method, for example, corresponds to the described operating method of the system elucidated with reference to FIGS. 1 through 6.

The illustrated sequence starts in step 100 with a new measuring cycle of radar sensor 16 which, for example, includes four frequency modulation ramps.

In step 102, the new measuring cycle is provided with associated new measured data, in particular relative speed v, object distance d, and azimuth angle $\theta_i$ in the case of measured radar reflections off a radar object 12. These values are, for example, provided by the digital signal processing unit 20.

In step 104, the measured position distribution is formed over the last measuring cycles, in particular the n last measuring cycles. The position distribution may, for example, be the distribution of lateral position dy or the distribution of angular positions $\theta_i$, i.e., the azimuth angles.

In step 106, a comparison takes place of the measured position distribution to a model of the expected position distribution which is a function of the object distance. It should be noted that the distribution in the case of a new start of the method is initially built up over the necessary number of measuring cycles prior to a comparison to the model in step 106.

In step 108, an object position of a radar object 12 is determined by unit 34, for example, based on the carried-out comparison.

A step 110 of object tracking or object management may now follow and the method is repeated starting with step 100 of a new measuring cycle.

What is claimed is:

1. A method for detecting a radar object using an angle-resolving radar sensor of a motor vehicle in a presence of an object that extends in a driving direction laterally next to a lane of the motor vehicle and reflects a radar wave, the method comprising:
   comparing a measured position distribution, which corresponds to a distribution of azimuth angles of received radar signals of the radar sensor reflected off the radar object and the object that extends in a driving direction laterally next to a lane of the motor vehicle, to a model of a position distribution;
   determining a position of the radar object based on a result of the comparison; and
   adjusting a speed of the motor vehicle based on the determined position of the radar object,
   wherein the model of the position distribution: (i) accounts for the presence of the object that extends in the driving direction next to the lane of the motor vehicle and (ii) is selected as a function of a distance from the radar object.

2. The method as recited in claim 1, further comprising:
   before the comparing step:
   receiving radar signals reflected off of the radar object and the object that extends in a driving direction laterally next to a lane of the motor vehicle;

continuously updating records of positions that correspond to azimuth angles of the received radar signals; and determining the measured position distribution based on the continuously updated records.

3. The method as recited in claim 1, further comprising:
before the comparing step:
for a plurality of measuring cycles of the radar sensor:
for each measuring cycle in the plurality of measuring cycles:
receiving radar signals reflected off of the radar object, and determining information regarding at least one position which corresponds to an azimuth angle of the received radar signals of the radar sensor; and
determining the measured position distribution based on the received radar signals from the plurality of measuring cycles.

4. The method as recited in claim 3, further comprising:
before the comparing step, for each measuring cycle in the plurality of measuring cycles:
determining information regarding at least one of: a relative speed and a distance, which corresponds to the azimuth angle of the received radar signals of the radar sensor.

5. The method as recited in claim 1, wherein:
the model of the position distribution includes a plurality of model phases,
the plurality of model phases correspond to expected position distributions, and
the plurality of model phases differ in relation to a reduction of the distribution being at least one of present and pronounced in a transition range between positions which correspond to the position of the radar object and a position of a mirror object.

6. The method as recited in claim 5, further comprising:
determining a model phase of the model based on the result of the comparison, the model phase being selected from a plurality of model phases of the model.

7. The method as recited in claim 1, wherein:
the model of the position distribution includes a plurality of model phases, and
the plurality of model phases correspond to expected position distributions,
each of the plurality of model phases includes a scatter of values of the distribution around one position corresponding to the radar object and around one position corresponding to a mirror object, and
the plurality of model phases differ with regard to a scattering width which is a function of the distance from the radar object.

8. The method as recited in claim 1, wherein:
the model of the position distribution includes a plurality of model phases,
the plurality of model phases correspond to expected position distributions, and
the plurality of model phases including:
at least one model phase having a position distribution which scatters uniformly between a position of the radar object and a position of a mirror object, and
at least one model phase having a position distribution with two separate peaks, each of which corresponds to the position of the radar object and a position of a mirror object.

9. The method as recited in claim 1, wherein:
the model of the position distribution includes a plurality of model phases,
the plurality of model phases correspond to expected position distributions, and
the plurality of model phases including:
at least one model phase having a position distribution with two peaks in positions which correspond to the position of the radar object and a position of a mirror object, and
at least one model phase having a position distribution with only one peak in a position which corresponds to the position of the radar object.

10. A system for detecting a radar object using an angle-resolving radar sensor of a motor vehicle in a presence of an object that extends in a driving direction laterally next to a lane of the motor vehicle and reflects a radar wave, the system comprising:
a unit which is configured to determine a measured position distribution which corresponds to a distribution of azimuth angles of received radar signals of the radar sensor reflected off the radar object and off the object that extends in a driving direction laterally next to a lane of the motor vehicle;
a unit which is configured to perform a first comparison of the measured position distribution to a model of a position distribution;
a unit which is configured to determine a position of the radar object based on a result of the first comparison; and
a unit which is configured to adjust a speed of the motor vehicle based on the determined position of the radar object,
wherein the model of the position distribution: (i) accounts for the presence of the object that extends in the driving direction next to the lane of the motor vehicle and (ii) is selected as a function of a distance from the radar object.

11. The system as recited in claim 10, further comprising:
a radar sensor receiver which is configured to receive radar signals reflected off of the radar object and the object that extends in a driving direction laterally next to a lane of the motor vehicle and provide the received radar signals to the unit which is configured to determine a measured position distribution, and
the unit which is configured to determine the measured position distribution is further configured to continuously update records of positions that correspond to azimuth angles of the received radar signals and to determine the measured position distribution based on the continuously updated records.

12. The system as recited in claim 11, wherein the radar sensor receiver is included in a frequency modulated continuous wave (FMCW) radar.

13. The system as recited in claim 10, further comprising:
a radar sensor receiver which is configured to, for a plurality of measuring cycles of the radar sensor:
for each measuring cycle receive radar signals reflected off of the radar object and the object that extends in a driving direction laterally next to a lane of the motor vehicle; and
the unit which is configured to determine the measured position distribution is further configured to:
for each measuring cycle: determine information regarding at least one position which corresponds to an azimuth angle of the received radar signals of the radar sensor, and
for the plurality of measuring cycles: determine the measured position distribution based on the received radar signals.

14. The system as recited in claim 13, wherein the unit which is configured to determine the measured position distribution is further configured to, for each measuring cycle:
determine information regarding at least one of: a relative speed and a distance, which corresponds to the azimuth angle of the received radar signals of the radar sensor.

15. The system as recited in claim 13, wherein the unit which is configured to determine the measured position distribution performs a compensating weighting of a first set of values from a one target estimator and a second set of values from a two target estimator.

16. The system as recited in claim 10, wherein:
the model of the position distribution includes a plurality of model phases,
the plurality of model phases correspond to expected position distributions, and
the plurality of model phases differ in relation to a reduction of the distribution being at least one of present and pronounced in a transition range between positions which correspond to the position of the radar object and a position of a mirror object.

17. The system as recited in claim 16, further comprising:
a unit which is configured to determine a model phase of the model based on the result of the first comparison, the model phase being selected from a plurality of model phases of the model.

18. The system as recited in claim 10, wherein:
the model of the position distribution includes a plurality of model phases, and
the plurality of model phases correspond to expected position distributions,
each of the plurality of model phases includes a scatter of values of the distribution around one position corresponding to the radar object and around one position corresponding to a mirror object, and
the plurality of model phases differ with regard to a scattering width which is a function of the distance from the radar object.

19. The system as recited in claim 10, wherein:
the model of the position distribution includes a plurality of model phases,
the plurality of model phases correspond to expected position distributions, and
the plurality of model phases include:
at least one model phase having a position distribution which scatters uniformly between a position of the radar object and a position of a mirror object, and
at least one model phase having a position distribution with two separate peaks, each of which corresponds to the position of the radar object and a position of a mirror object.

20. The system as recited in claim 10, wherein:
the model of the position distribution includes a plurality of model phases,
the plurality of model phases correspond to expect position distributions, and
the plurality of model phases including:
at least one model phase having a position distribution with two peaks in positions which correspond to the position of the radar object and a position of a mirror object, and
at least one model phase having a position distribution with only one peak in a position which corresponds to the position of the radar object.

* * * * *